United States Patent
Farchi et al.

(10) Patent No.: US 7,546,589 B2
(45) Date of Patent: Jun. 9, 2009

(54) SEMI-AUTOMATED DESK CHECKING SYSTEM AND METHOD

(75) Inventors: Eitan Farchi, Pardes-Hanna-Carcur (IL);
Shachar Fienblit, Ein Ayala (IL);
Amiram Hayardeny, Binyamina (IL);
Shmuel Ur, Shorashim (IL)

(73) Assignee: International Business Machines Corporation, Armonk, NY (US)

( * ) Notice: Subject to any disclaimer, the term of this patent is extended or adjusted under 35 U.S.C. 154(b) by 887 days.

(21) Appl. No.: 11/037,637

(22) Filed: Jan. 18, 2005

(65) Prior Publication Data
US 2006/0161904 A1    Jul. 20, 2006

(51) Int. Cl.
*G06F 9/44* (2006.01)
*G06F 9/45* (2006.01)

(52) U.S. Cl. ............ 717/135; 717/129; 717/131; 717/134; 717/142; 717/143; 717/144

(58) Field of Classification Search ............. None
See application file for complete search history.

(56) References Cited

U.S. PATENT DOCUMENTS 6,839,893 B2 * 1/2005 Bates et al. ............... 717/124
2002/0120919 A1 * 8/2002 Aizenbud-Reshef et al. 717/127

OTHER PUBLICATIONS

Gil Ratazby, Shmuel Ur et al. "Coverability Analysis Using Symbolic Model Checking CHARME 2001", Mar. 1998 (Hereinafter Gil).*

* cited by examiner

*Primary Examiner*—Chuck O Kendall

(57) ABSTRACT

A system and method for a desk checker includes a partial state representation, a simulator controller to access the partial state representation and to continue a simulation without state information, and a desk checking component controlled by the simulator controller. The desk checking component includes any of a user interface, a static analysis engine, a partial execution component, and an analyzer. The system and method for desk checking includes simulating code execution on a computing device with partial state information and requesting user input to supplement the partial state information.

25 Claims, 2 Drawing Sheets

SEMI-AUTOMATED DESK CHECKING SYSTEM AND METHOD

FIELD OF THE INVENTION

The present invention relates to desk checking in general, and more particularly to semi-automated desk checking.

BACKGROUND OF THE INVENTION

Manual desk check testing, also known as manual program tracing, and its derivative, the interleaving review technique, are well known in the art and are used for early error detection or finding faults (bugs) during code inspections. Values of variables are tracked manually using pencil and paper as the reviewer inspects the code step-by-step, calculating the program state after a program statement "executes". Though cost effective, this process is tedious.

During desk checking, the program is assumed to be in some state. However, as concurrent and/or distributed programs can be nondeterministic, the state after execution will depend on which process executed. Checking every possible combination of execution order entails too many choices. Furthermore, when considering all the possible paths over the course of program execution, the space of possible program schedules, or the space of possible interleavings, becomes exponential. This also leads to the creation of too many choices to be sure which subset of schedules to review. Finally, it is no longer sufficient to consider local program states that belong to only one process or thread. The state of the concurrent and/or distributed program is determined by the state of all its processes and their interrelated temporal dependencies.

Debuggers support the exploration of code in a way similar to desk checking, but require that the entire environment be available and set up. This is often not the case in typical software projects at early stages of the development process. At times, the code is available before the hardware. In addition, generally, not all the software components are ready at the same time. Other possible reasons that the entire environment is not available are possible, for example, the complete environment is available only remotely from the development location. An incomplete environment requires writing scaffold tests, resulting in large amounts of unusable code. Alternatively, testing is delayed until a complete environment is available, thus missing the opportunity to test early.

SUMMARY OF THE INVENTION

Applicants have developed an improved system and method for semi-automated desk checking which may allow a simulation of code execution that may not require a complete execution environment. It may allow the testing of code segments independently of hardware and/or other software components.

The current invention may be used to assist in a code inspection to allow a computing device to simulate the execution of code in a partially defined environment. The user may set breakpoints and may initialize a partial program state.

There is provided in accordance with an embodiment of the present invention, a desk checking method including simulating code execution on a computing device with partial state information and requesting user input to supplement the partial state information.

There is further provided in accordance with an embodiment of the present invention, a desk checking system including a partial state representation, a simulator controller to access the partial state representation and to continue a simulation without state information, and a desk checking component controlled by the simulator controller. The semi-automatic desk checking component includes any of a user interface, a static analysis engine, a partial execution component, and an analyzer.

There is further provided in accordance with an embodiment of the present invention, a desk checking system including a code execution simulator including partial state information on a computing device and a user input to request further partial state information to supplement the partial state information.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings, in which:

Figure 1:
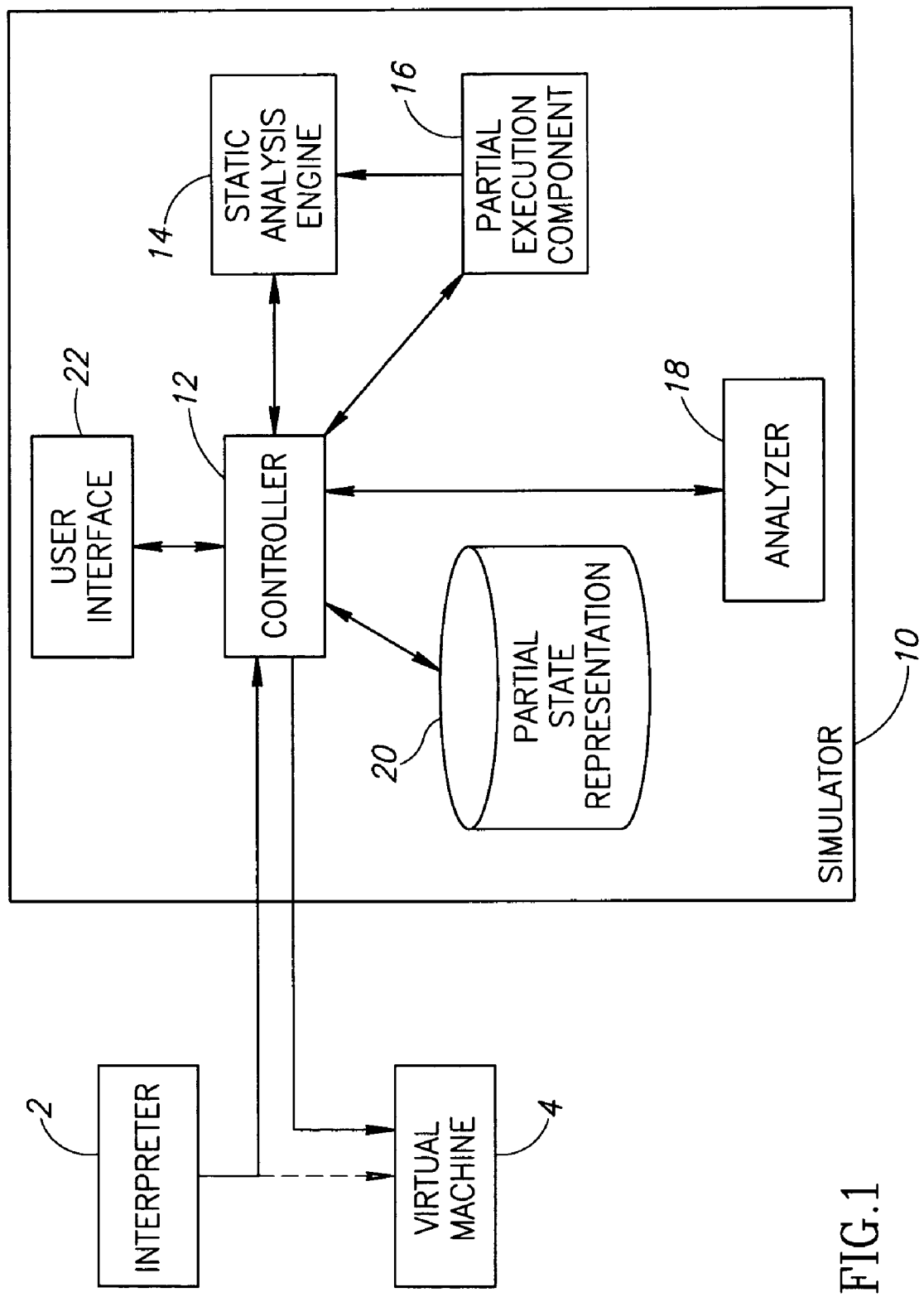
FIG. 1 is a block diagram illustration of a semi-automated desk checking system, in accordance with an embodiment of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, and components have not been described in detail so as not to obscure the present invention.

Unless specifically stated otherwise, as apparent from the following discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Reference is now made to FIG. 1, a block diagram illustration of a semi-automated desk checking system, in accordance with an embodiment of the present invention, comprising a simulator 10 interposed between an interpreter 2 and a virtual machine 4. Interpreter 2 may be any interpreter known in the art, which may be used in a desk checking system, for example, a basic or Java™ interpreter. Interpreter 2 may output code, possibly one command at a time. Interpreter 2, in a further embodiment of the present invention, may represent the processing of code output by a compiler. Simulator 10 may be an instance of a decorator. Simulator 10 may act upon the code (as described hereinbelow) before it is input to virtual machine 4. Virtual machine 4 may be any implementation known in the art that may be used in a desk checking system, for example, the Java™ virtual machine (JVM). Java™ and Java™ virtual machine are available from Sun Microsystems, Inc., Santa Clara, Calif., USA.

Simulator 10 may comprise a controller 12 that may be operatively connected to an optional static analysis engine 14, an optional partial execution component 16, an optional analyzer 18, a partial state representation 20, and an optional user interface 22. Controller 12 may control communication among components of simulator 10, wherein communication between controller 12 and other components may be bi-directional. In addition, partial execution component 16 may initiate queries to static analysis engine 14.

Controller 12 may intercept code output by interpreter 2. Controller 12, as described hereinbelow, may analyze the code to determine whether with the currently available partial state representation 20, virtual machine 4 would be able to execute the current code block. If it is determined that it can, the code may be passed to the virtual machine. If not, simulator 10 may perform an automatic or semi-automatic code execution and/or analysis as described hereinbelow. In an embodiment of the present invention controller 12 may allow a simulation to continue after encountering missing data or code. Simulation may continue with the available information and may calculate all partial information that it may be possible.

Partial state representation 20 may comprise a set of values corresponding to the state of a subset of the program variables. Partial state representation 20 may comprise for example, actual variable values, function return values, and information such as if a whether a variable is even or odd. The partial state of the program memory model may comprise stack, heap, and/or register values. It may further comprise secondary storage contents such as the contents of a file or a database table. Together these values may represent the current state of the program to the extent it is known. In an embodiment of the present invention, partial state representation 20 may be stored in a database or other accessible data storage.

Partial state representation 20 may comprise a complete record of simulation(s). Such a record may comprise the exact steps taken, the order of command execution, values input by user or deduced in the course of the simulation. Such a record may allow the replay of a specific simulation enabling a recreation of a specific state. This may be used for example for further debugging or continuation from a previously arrived at point.

User interface 22 may comprise an interface to communicate with a user, for example a code inspector. As explained hereinbelow, a user may be queried by simulator 10 and/or the user may query simulator 10. In an embodiment of the present invention user interface 22 may comprise a separate display, for example a window, for each thread in a multi-threaded and/or distributed environment. This may allow a generally simultaneous display of multiple threads.

Depending on the type of program command being interrupted, various types of analysis and/or execution may be performed. Controller 12 may control updates to and reading of partial state representation 20, input and output to user interface 22 as well as coordinating and controlling the action of static analysis engine 14, partial execution component 16, and analyzer 18.

Static analysis engine 14 may comprise the ability to access a copy of the program code. Static analysis, which is well known in the art, may be used in several ways by static analysis engine 14. For example, static analysis engine 14 may use static analysis to decide whether to send the current interrupted program command to virtual machine 4 for execution, to attempt to deduce additional state information by performing a partial execution using partial execution component 16, and/or to query the reviewer for additional information.

Several non-limiting examples follow. Static analysis engine 14 may check if a predetermined breakpoint can be reached. Static analysis engine 14 may determine a subset of variables from all variables in the program block that would allow the simulation to proceed the farthest if their values were known. Static analysis engine 14 may determine whether a value given to a variable may affect future execution.

If the analysis performed by static analysis engine 14 determines that unwanted consequences may occur given the current partial information, controller 12 may inform the user via user interface 22. In a further embodiment of the present invention, static analysis engine 14 may comprise a model checking tool. Model checking tools comprise functionality similar to that of a static analysis tool.

Partial execution component 16 may execute code statements using partial information on the state(s) of variable(s). This may be possible as long as the results do not interfere with the execution of later statements. Several non-liming exemplary scenarios of the use of partial execution component 16 follow. For example, a user may indicate that some program location should not be reached; however, continued partial execution may determine that this location can be reached. In such a case, the user may be informed at the current decision point that executing the current program-command in a given way may allow execution of the program to get to a place it should not reach. For example, when it is determined by partial execution component 16 that future execution may be impacted, static analysis engine 14 may be queried. For example, given the expression "x=x+y", not knowing the value of y may not matter if x does not later impact execution control. Future control impacts may be determined by static analysis engine 14. For example, given p, a pointer to a class instance, knowing that p was allocated and initialized may be sufficient to know that p.$f$( ) (a call to the class method) will not create an exception. An exception may cause a change of control flow and hence the breakpoint might not be reached. Knowing that the result of the call will not be null may suffice and the exact value may not be necessary. Partial execution may continue until the whole block has been executed. Alternatively, partial execution may stop when static analysis engine 14 determines that continuing will interfere with execution of later statements or reaching a predefined breakpoint.

Analyzer 18 may perform local analysis and may deduce additional information related to the partial state variables and/or the value of a conditional statement or a function. This may enable the partial execution to continue further without the need to query the user. Several examples follow. For example, given the condition "(a OR b)", analyzer 18 may be able to deduce from the partial state information that a is TRUE. For example, it may be deduced that after execution of a calculation an even integer variable remains even. Then, if a later control flow conditional decision is based on whether or not the value of that variable is even, it may be possible to determine the outcome even if the exact value of the variable is not known. In general, analyzer 18 may attempt to make any appropriate abstraction that will enable the evaluation of the current command without knowing all of the variable values that are used to calculate the command. Partial state representation 20 may be updated by controller 12 with any new values deduced by analyzer 18. For example, given "y=x+x" then if x is even, analyzer 18 may deduce that y is even and partial state representation 20 may be updated with this new value.

The current invention may be used to assist in a code inspection to allow a computing device to simulate the execution of code in a partially defined environment. The user may set breakpoints and may initialize a partial program state. Values that are not initialized may be given a value indicating that they are not defined. A simulation may continue until a breakpoint is reached. At the user's discretion, the simulation may single step through the code. When information such as code or a variable value, which is required to fully execute a simulation is missing, use of the simulator of the present invention may allow the simulation to continue. The simulator of the present invention may provide a complete record of a simulation. User input may cause a change of control flow. State information may be updated after a change in control flow to maintain a complete, retrievable record of the simulation.

Figure 2:
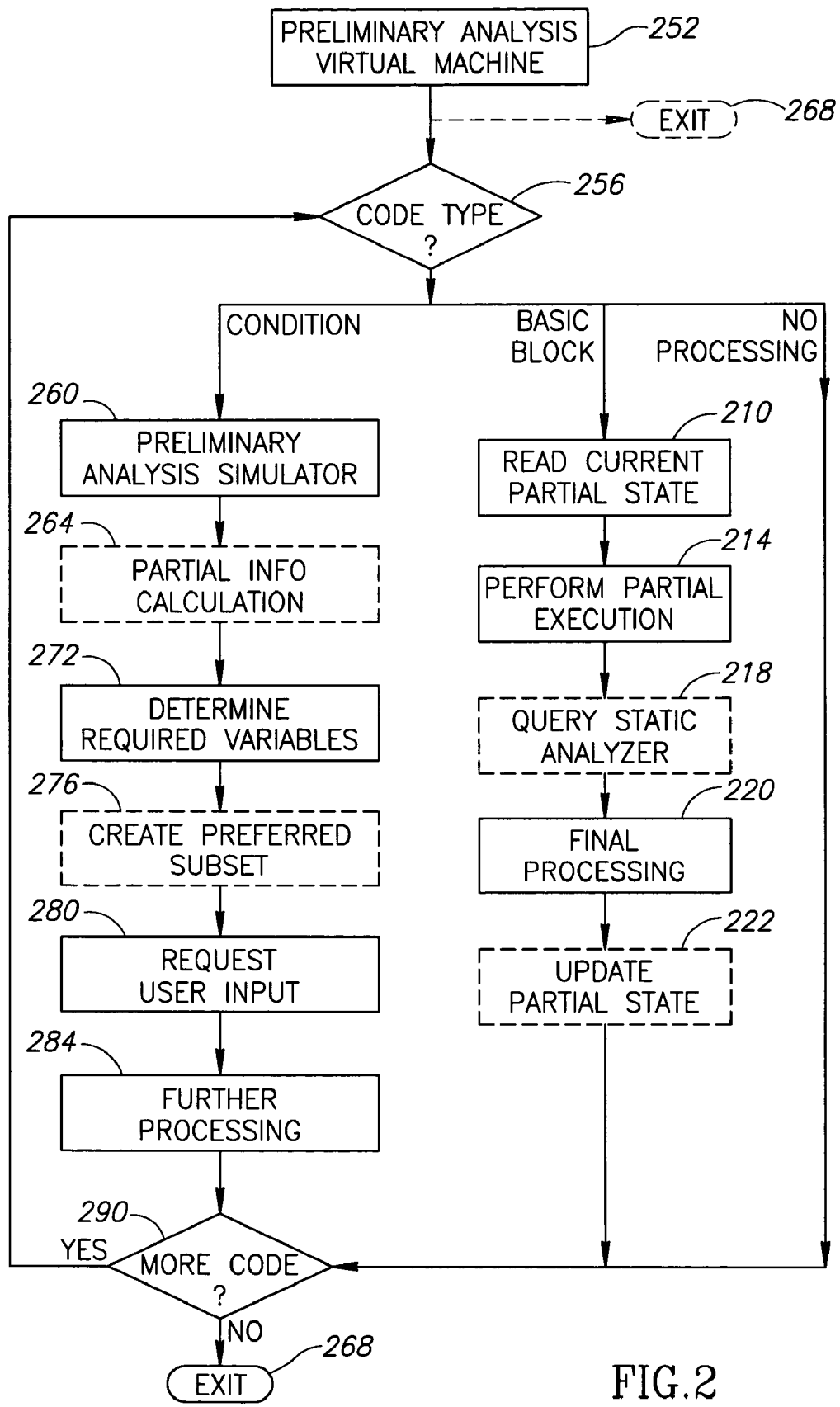
FIG. 2 is a data flow diagram of a semi-automated desk checking method, in accordance with an embodiment of the present invention.

Reference is now made to FIG. 2, a data flow diagram of a semi-automated desk checking method, in accordance with an embodiment of the present invention. Upon interception of a code segment by controller 12 (FIG. 1), a preliminary analysis may be performed to determine if the code segment may be run on the virtual machine with only the current available partial state information (bock 252). If it may, simulator 10 (FIG. 1) may be exited and control passed to the virtual machine (block 268). If the available information is not sufficient, simulator 10 may be used to deduce additional state information and may minimize required user input. The type of the code segment may be determined (block 256). Possible code segments may comprise a condition statement, a basic block, and a "no processing" block.

If the code type comprises a "no processing" block processing may not occur and the simulation may proceed to block 290. Processing may not occur, for example, due to a lack of data or unavailable code blocks. For example, given the following code fragment:

```
case (x)
    1: y = 1
    2: y = 0
    else: y = 0
if (y)
```

If the value of x is not known, no case statement choices may be processed. To evaluate the "if" condition the user may have to be queried as explained hereinbelow. Code blocks may be unavailable, for example, a function call to a function, which has not been written yet or that is not being tested.

In a further embodiment of the present invention, processing may not occur because the processing results are not necessary in the current simulation scenario, for example, given the current breakpoints. Processing may occur only when it is determined that it is necessary, in that variable(s) set or returned by the function call or "no operation" program segment are needed. For example, given the following few commands: "y=$f$(x)", "w=$f$(y)", "if(w)". The two function calls may not be processed initially. When the condition statement is reached however, to evaluate the condition either the value of w may be requested or the function $f$(y) may be simulated. It may not be necessary to determine the value of y or $f$(x) during the whole course of the simulation.

If the code type comprises a condition statement, a preliminary analysis may be performed to determine whether partial execution component 16 (FIG. 1) has enough partial state information to calculate the condition (block 260). The preliminary analysis may comprise retrieval of the current partial state and the performance of static analysis. For example, static analysis may deduce that some variable is always positive. Although its exact value is not known, it may be possible to deduce the outcome of the condition if the outcome depends on whether the variable is positive or not. If the preliminary analysis determines that it is possible, a calculation may be made to evaluate the condition statement (block 264). If so there may be no missing required variables requiring user input and so blocks 272, 276, and 280 may not require any action.

If the preliminary analysis determines that it may not be possible to calculate the condition with the current partial information, an analysis may be made of the condition, which may determine the set of variables required for the calculation (block 272). Optionally, if possible, a preferred subset of these variables may be created (block 276). A preferred subset may comprise those variables that will allow the code processing to get the farthest. A request for user input may be made (block 280). This request may comprise a request for the values of all the subset variables, a request for the full set of variables, a request that the user decide what the preferred subset is, and/or that the user decide on the value of the condition.

Further processing may be necessary after the determination of the condition value (block 284) whether the value was calculated directly from the partial information or with user input. Further processing may comprise for example, checking of breakpoints, deduction of variable values, and/or checking the consistency of a user decision(s). If necessary, any of blocks 260-284 may be repeated.

If the code type comprises a control block or a basic block, the current partial state may be read (block 210). A partial execution may be performed (block 214). Partial execution may attempt to perform all possible calculations. For example, given "x=f(a) OR f(b)" both functions may be calculated although only one may be necessary. This may provide, for example, additional partial data that may be useful. This may be different from the condition statement case when only the easier function may be executed. To get still further partial data, the static analyzer may optionally be queried (block 218). Final processing may be performed (block 220). Final processing may for example, determine if the calculated variables may impact future control flow or whether a predetermined breakpoint may be reached with these values. If the final processing reveals a negative impact some additional action may be necessary such as an immediate jump to the breakpoint or a warning may issued. Once final processing is complete, the partial state may optionally be updated (block 222).

When processing of the block completes, a determination may be made whether any further code remains to be executed (block 290). For example, the whole code segment may have been executed. For example, static analysis engine may determine that continuing will interfere with the execution of later statements or with reaching a predefined breakpoint. If yes, return to block 256 to continue processing. If not, simulator 10 (FIG. 1) may be exited and control passed to the virtual machine (block 268).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for executing logic code, the method comprising:
    executing logic code according to first state information, wherein the first state information comprises values needed to execute the logic code in a first execution environment; and
    continuing the executing of the logic code according to the first state information, in response to determining that second state information is unavailable, wherein the second state information comprises values needed to execute the logic code in the first execution environment.

2. The method of claim 1, wherein the first and the second state information comprise at least a condition statement value.

3. The method of claim 1, wherein the first and the second state information comprise at least a variable value.

4. The method of claim 1, further comprising storing the first state information in a storage medium.

5. The method of claim 4, further comprising using static analysis.

6. The method of claim 4, wherein said using static analysis comprises deducing the second state information.

7. The method of claim 6, wherein the deduced second state information is stored in a storage medium.

8. The method of claim 5, wherein said using static analysis comprises determining whether a breakpoint is reachable.

9. The method of claim 8, further comprising selecting an action, in response to determining that the breakpoint is reachable.

10. The method of claim 8, further comprising jumping to the breakpoint, in response to determining that the breakpoint is unreachable.

11. The method of claim 1, further comprising determining future control impacts.

12. The method of claim 1, further comprising displaying representations of multiple threads approximately simultaneously.

13. A method for executing logic code, the method comprising:
    executing logic code according to first state information, wherein the first state information comprises values for variables needed to execute the logic code in a first execution environment;
    interrupting the executing of the logic code, in response to determining that second state information is unavailable, wherein the second state information comprises values for variables needed to execute the logic code in the first execution environment;
    generating a request for the second state information to be provided by a source external to the first execution environment, in response to determining that the second state information is unavailable; and
    continuing the executing of the logic code according to the first state information and the second state information, in response to the second state information being provided by the source.

14. The method of claim 13, wherein the second state information is provided by a user.

15. The method of claim 14, wherein the second state information provided by the user is checked for consistency.

16. The method of claim 13, wherein the first and the second state information comprise at least a condition statement value.

17. The method of claim 13, wherein the first and the second state information comprise at least a variable value.

18. The method of claim 13, further comprising storing the first state information in a storage medium.

19. The method of claim 13, further comprising storing the second state information in a storage medium.

20. The method of claim 13, further comprising using static analysis.

21. The method of claim 20, wherein said using static analysis comprises determining whether a breakpoint is reachable.

22. The method of claim 21, further comprising selecting an action, in response to determining that the breakpoint is reachable.

23. The method of claim 21, further comprising jumping to the breakpoint, in response to determining that the breakpoint is unreachable.

24. The method of claim 13, further comprising determining future control impacts.

25. The method of claim 13, further comprising displaying representations of multiple threads approximately simultaneously.

* * * * *